(12) United States Patent
Rivet

(10) Patent No.: US 7,440,299 B2
(45) Date of Patent: Oct. 21, 2008

(54) CONTROL OF A MOS TRANSISTOR AS RECTIFYING ELEMENT

(75) Inventor: Bertrand Rivet, Tours (FR)

(73) Assignee: STMicroelectronics S.A., Montrouge (FR)

( * ) Notice: Subject to any disclaimer, the term of this patent is extended or adjusted under 35 U.S.C. 154(b) by 0 days.

(21) Appl. No.: 11/903,192

(22) Filed: Sep. 20, 2007

(65) Prior Publication Data

US 2008/0165556 A1    Jul. 10, 2008

Related U.S. Application Data

(63) Continuation of application No. 10/978,316, filed on Oct. 29, 2004, now abandoned.

(30) Foreign Application Priority Data

Oct. 31, 2003    (FR) .................................. 03 12816

(51) Int. Cl.
  *H02M 5/42* (2006.01)
(52) U.S. Cl. ........................ 363/89; 363/127
(58) Field of Classification Search .................. 363/89, 363/127, 21.06, 21.14
  See application file for complete search history.

(56) References Cited

U.S. PATENT DOCUMENTS

| 5,268,833 | A | 12/1993 | Axer |
| 5,517,399 | A * | 5/1996 | Yamauchi et al. ............. 363/89 |
| 5,744,994 | A | 4/1998 | Williams |
| 5,986,899 | A | 11/1999 | Xia et al. |
| 6,026,005 | A | 2/2000 | Abdoulin |
| 6,239,994 | B1 | 5/2001 | Abdoulin |
| 6,421,261 | B1 | 7/2002 | Fujisawa et al. |
| RE38,196 | E | 7/2003 | Vinciarelli et al. |
| 6,768,655 | B1 | 7/2004 | Yang et al. |
| 6,839,247 | B1 | 1/2005 | Yang et al. |

OTHER PUBLICATIONS

French Search Report from French Patent Application 03/12816 filed Oct. 31, 2003.

* cited by examiner

*Primary Examiner*—Shawn Riley
(74) *Attorney, Agent, or Firm*—Lisa K. Jorgenson; James H. Morris; Wolf, Greenfield & Sacks, P.C.

(57) ABSTRACT

A circuit for controlling a switch to be controlled in unidirectional fashion while the voltage present thereacross is an A.C. Voltage, including circuitry for delaying the switch turning-on with respect to a zero crossing of the voltage thereacross, and circuitry for triggering the switch turning-off after its turning on, at the end of a predetermined time interval plus or minus an error time controlled by the duty cycle of the A.C. Voltage across the switch, in one or several previous periods. The control circuit applies to the forming of a rectifying circuit by the switch.

31 Claims, 3 Drawing Sheets

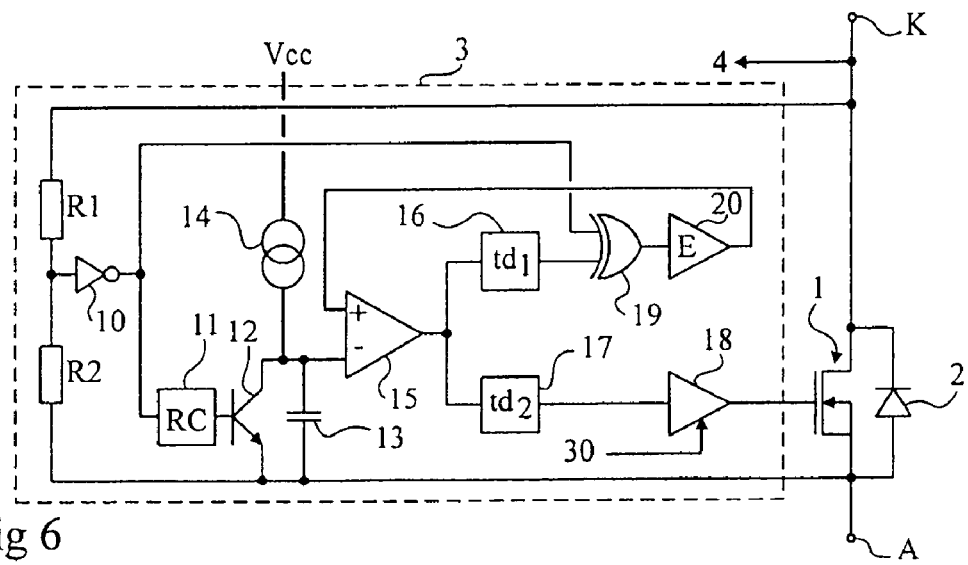
Fig 6
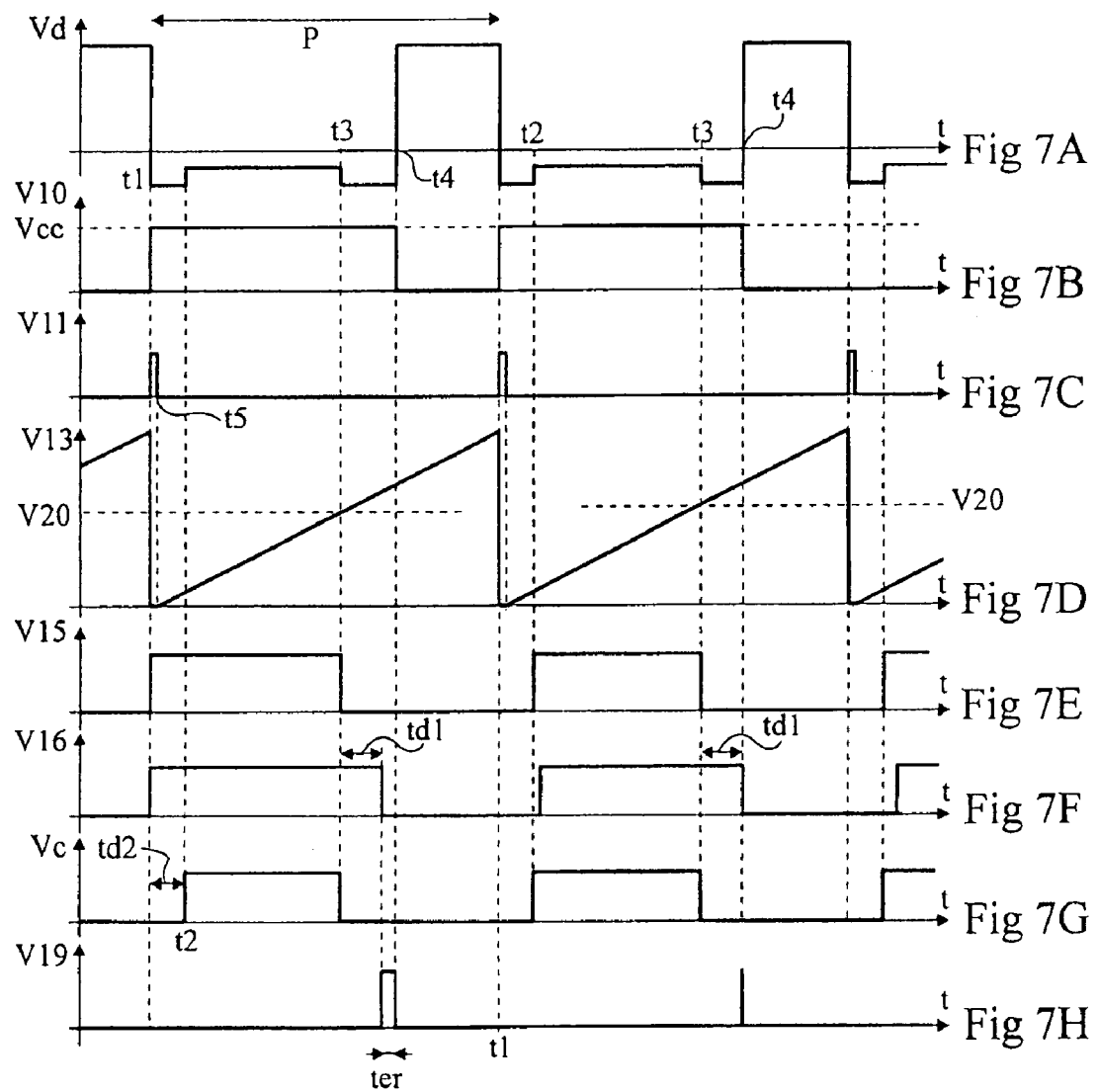
Fig 7A
Fig 7B
Fig 7C
Fig 7D
Fig 7E
Fig 7F
Fig 7G
Fig 7H

US 7,440,299 B2

CONTROL OF A MOS TRANSISTOR AS RECTIFYING ELEMENT

CROSS REFERENCE TO RELATED APPLICATIONS

This application is a continuation of U.S. application Ser. No. 10/978,316, filed Oct. 29, 2004 entitled CONTROL OF A MOS TRANSISTOR AS A RECTIFYING ELEMENT, which application is incorporated herein by reference in its entirety.

BACKGROUND OF THE INVENTION

1. Field on the Invention

The present invention relates to A.C. voltage rectifying elements. The present invention more specifically relates to the implementation of a rectifying function (diode) by means of a MOS transistor.

2. Discussion of the Related Art

FIG. 1 very schematically shows a first example of a circuit using rectifying elements of the type to which the present invention may apply. In this example, it is a so-called forward-type converter. Such a converter is essentially formed of a transformer T having a primary winding T1 receiving a D.C. voltage provided by a capacitor C1 connected to the output of a diode bridge B supplied with an A.C. voltage. Winding T1 is grounded by a switch K. Switch K is controlled in pulse-width modulation by a PWM signal (high-frequency with respect to the A.C. power supply) set to regulate a D.C. voltage Vout provided by the converter. Voltage Vout is provided on the secondary side T2 across a capacitor C2 storing the power transferred from primary T1 to secondary T2 of the transformer during periods when switch K is on. A first end of secondary winding T2 is connected, by a diode D1 in series with an inductance L1, to a first electrode of capacitor C2 defining a positive output terminal, while its other end is directly connected to the other electrode of capacitor C2 defining ground M2 on the side of voltage Vout. A free wheel diode D2 connects the junction point of diode D1 and of inductance L1 to ground M2, the anode of the diode being on the ground side. The operation of such a converter is known.

The rectifying elements are here formed of diodes D1 and D2 which have the disadvantage of exhibiting a threshold voltage on the order of from 0.3 to 1.5 volts, which adversely affects the converter operation, especially in low-voltage applications.

FIG. 2 partially and schematically illustrates a modification applied to a PWM converter of FIG. 1 to decrease the threshold voltage of the rectifying elements. In FIG. 2, only a portion of the secondary has been shown, the rest being similar to FIG. 1. To decrease the threshold voltage of diodes D1 and D2, said diodes are replaced with two N-channel MOS transistors N1 and N2 which are adequately controlled by a specific circuit CTRL. For voltage reference reasons, transistor N1 replacing diode D1 must however be placed on the ground branch of the converter, while transistor N2 can be placed in the same way as diode D2 of FIG. 1. Control circuit CTRL further receives a supply voltage SUPPLY as well as a signal SYNCH of synchronization with respect to the switching of the D.C. voltage performed on the primary side, to synchronize the respective turn-off and turn-on times of transistors N1 and N2 with the turn-off and turn-on times of switch K (not shown in FIG. 2).

A disadvantage of the synchronous rectifying circuit of FIG. 2 is that transistors N1 and N2 cannot have an autonomous operation. They need a synchronization signal coming from the primary as well as a supply voltage.

Another disadvantage is the presence of a MOS transistor on the ground line and not on the high line on the secondary side.

FIG. 3 illustrates another example of a voltage converter to which the present invention applies. It is a D.C./D.C. converter having the function of raising an output voltage Vout with respect to the level of an input voltage V1 provided, for example, by a battery. The positive electrode of battery V1 is connected to a first end of an inductance L having its other end connected, by a first MOS transistor N1, to a first electrode of an output capacitor across which is sampled output voltage Vout. The junction point of inductance L and of transistor N1 is further connected, by a transistor N2, to the ground defined by the negative electrode of battery V1 to which the second electrode of capacitor C is connected. In such an application, the control of transistors N1 and N2 is particularly difficult since it requires a level shifter to control transistor N1 which has no ground reference.

It would be desirable to have a rectifying element with a low threshold voltage, which does not pose the problems of MOS transistor control in conventional configurations.

SUMMARY OF THE INVENTION

The present invention aims at providing a circuit of autonomous control of a MOS transistor ensuring a rectifying function.

The present invention also aims at providing an autonomous rectifying element, that is, with two terminals, comprising a MOS transistor and its control circuit.

To achieve these and other objects, the present invention provides a circuit for controlling a switch to be controlled in unidirectional fashion while the voltage present thereacross is an A.C. voltage, comprising:

means for delaying the switch turning-on with respect to a zero crossing of the voltage thereacross; and means for triggering the switch turning-off after its turning on, at the end of a predetermined time interval plus or minus an error time controlled by the duty cycle of the A.C. voltage across the switch, in one or several previous periods.

According to an embodiment of the present invention, said predetermined duration is selected according to the maximum expected variations of the duty cycle.

According to an embodiment of the present invention, a capacitor and a diode are series-connected between the terminals of the switch to provide a supply voltage to the control circuit, the capacitor being charged when the switch is off.

According to an embodiment of the present invention, the control circuit comprises:

a circuit for detecting the sign of the voltage across the capacitor;

a ramp generator reset on each sign switching of the voltage across the switch in a direction in which it must become conductive, said generator being controlled by the detection circuit;

a means for causing the turning-on of the switch after detection of a sign switching of the voltage thereacross; and a circuit for controlling the duration of the on state with a predetermined value.

According to an embodiment of the present invention, a first delay element brings a minimum delay to a turn-off order of the switch which follows its turning-on.

According to an embodiment of the present invention, a second delay element brings a delay to the turning-on of the switch with respect to the inversion of the voltage thereacross.

According to an embodiment of the present invention, an output amplifier providing the control signal of the switch is controlled by means for detecting an inversion of the voltage direction, to cause the turning-off of the switch in case of an incidental voltage inversion.

According to an embodiment of the present invention, the switch is a MOS transistor.

According to an embodiment of the present invention, a diode in parallel on the switch is used for the starting.

The present invention also provides a rectifying circuit with a low threshold voltage comprising a switch in parallel with a diode preferably formed of its parasitic diode, and a control circuit associated with a supply circuit drawing its power supply directly from across the controlled transistor when said transistor is on.

According to an embodiment of the present invention, the rectifying circuit exclusively comprises two external connection terminals.

The foregoing objects, features, and advantages of the present invention will be discussed in detail in the following non-limiting description of specific embodiments in connection with the accompanying drawings.

BRIEF DESCRIPTION OF THE DRAWINGS

FIG. 6 shows an embodiment of a circuit for controlling a MOS transistor assembled as a rectifying element according to the present invention;

FIGS. 7A to 7H illustrate, in the form of timing diagrams, the operation of the circuit of FIG. 6.

DETAILED DESCRIPTION

Figure 1:
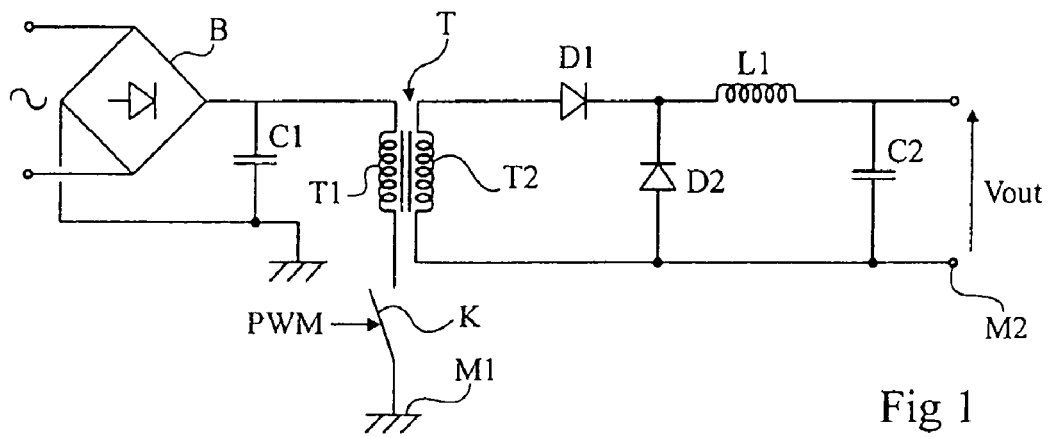
FIGS. 1 to 3, previously described, illustrate conventional examples of a rectifying element assembly to which the present invention applies.

The same elements have been designated with the same reference numerals in the different drawings. For clarity, only those elements which are necessary to the understanding of the present invention have been shown in the drawings and will be described hereafter. In particular, not all the possible applications of an autonomous rectifying circuit according to the present invention have been shown, the present invention generally applying to the replacing of a diode in a rectifying function with a MOS transistor and its control circuit.

A feature of the present invention is to control a MOS transistor having its drain and its source defining two end terminals of the rectifying circuit, by synchronizing its on periods exclusively according to the voltage present thereacross (between its drain and its source).

Preferably, the control circuit is autonomous, that is, it draws the power necessary to its operation from across the MOS transistor.

The present invention thus implements a diode function by means of an autonomous circuit exclusively having two terminals to be connected to the rest of the application.

Figure 4:
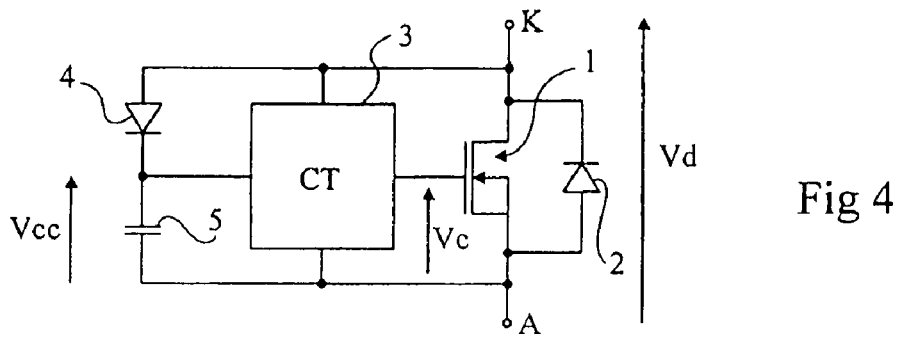
FIG. 4 very schematically shows an embodiment of a rectifying circuit based on MOS transistors according to the present invention.

FIG. 4 schematically shows, in the form of blocks, a rectifying circuit with a MOS transistor according to the present invention. This circuit essentially comprises an N-channel MOS transistor 1 having its source defining anode A of the rectifying circuit and having its drain defining cathode K thereof. A diode 2 is connected in parallel on transistor 1 with its anode confounded with the source of transistor 1. In practice, diode 2 may be formed by the parasitic diode of transistor 1.

According to the present invention, the gate of transistor 1 receives a control voltage Vc provided by a circuit 3 (CT) which sets the conduction periods of transistor 1 according to the voltage sensed thereacross. For this purpose, circuit 3 comprises two terminals respectively connected to electrodes K and A. Circuit 3 is further autonomously supplied with a voltage Vcc directly extracted from the voltage between terminals K and A. In the example of FIG. 4, the supply circuit is formed of a diode 4 having its anode connected to cathode K of the circuit and having its cathode connected, by a storage capacitor 5, to anode A. Voltage Vcc intended for circuit 3 is sampled across capacitor 5. This embodiment is a simplified embodiment, improved versions of which will be discussed hereafter.

According to the present invention, the halfwaves during which transistor 1 is off due to a positive voltage Vd between its terminals K and A (with the conventions chosen in the drawings) are used to charge capacitor 5, diode 4 being forward biased during these periods. During halfwaves when voltage Vd is negative, transistor 1 is turned on by circuit 3 and diode 4 prevents capacitor 5 from discharging other than by supplying circuit 3.

It can thus be seen that the present invention performs a rectifying function in the case where the voltage present between terminals K and A is a voltage which switches directions, that is, which comes from an A.C. source. More specifically, the present invention applies to the case where voltage Vd is of relatively high voltage switched-mode type (several tens of kilohertz) to avoid requiring a capacitor 5 having too large a size, said capacitor indeed having to maintain a sufficient charge during periods when transistor 1 conducts.

Of course, the voltage Vcc necessary to the operation of circuit 3 may be provided by other means, especially for the case where an adequate voltage is available in the rest of the circuit. However, the obtaining of voltage Vcc directly by the voltage across the circuit of the present invention is preferably, since this provides a completely autonomous circuit with no voltage reference problem.

Figure 5A:
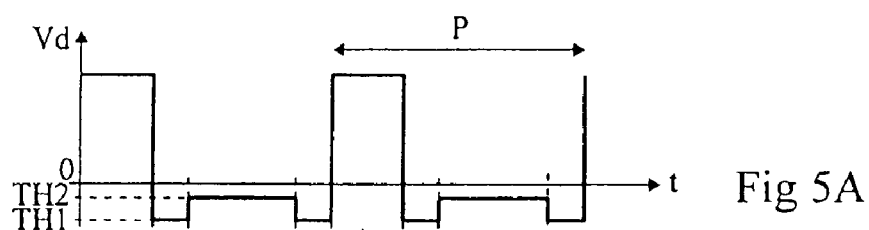
FIGS. 5A and 5B illustrate, in timing diagrams, the operation of the circuit of FIG. 4.
Figure 5B:
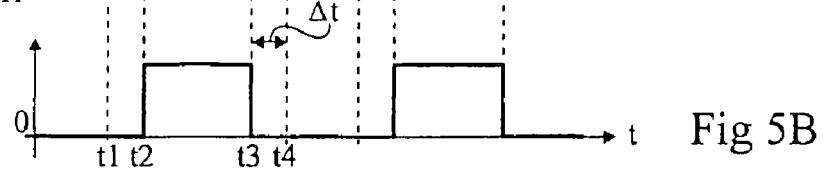

FIGS. 5A and 5B respectively illustrate, in the form of timing diagrams, an example of the shape of voltage Vd across transistor 1 and of the corresponding control voltage Vc provided by circuit 3.

As long as capacitor 5 is discharged (system starting), transistor 1 is off whatever voltage Vd (circuit 3 is not supplied and thus cannot ensure the control). A possible conduction during periods when the voltage of terminal A is greater than the voltage of terminal K (negative voltage Vd with the conventions of the drawings) is then ensured by diode 2, which is then forward biased. A few halfwaves of voltage Vd may be necessary to sufficiently charge capacitor 5 and enable starting of the system.

FIGS. 5A and 5B illustrate an example in steady state and, for simplification, assume a rectangular voltage Vd (for example, originating from a switched-mode power supply). All that will be discussed hereafter also applies in the case of a voltage Vd of sine or other shape, provided that it is an A.C. voltage.

During periods or halfwaves where voltage Vd across transistor 1 is positive, said transistor is off (Vc=0). Capacitor 5 charges during these periods.

At a time t1 when voltage Vd nulls out (change of halfwave towards a negative halfwave), the reverse voltage (negative voltage in the orientation of the drawing) is first limited to a first threshold TH1 corresponding to the threshold voltage (on the order of 0.7 volt) of diode 2. Indeed, as soon as voltage Vd reaches this negative value, diode 2 conducts and introduces a forward voltage drop of value TH1. Circuit 3 is designed to detect the occurrence of this negative voltage and to cause the turning-on of transistor 1 at a time t2 following time t1 with a predetermined duration. At time t2, transistor 1 is turned on, which reduces the forward voltage drop to threshold voltage TH2 of this transistor. In practice, this voltage drop is, at worst, smaller than 0.2 and can even be reduced to approximately 50 mV. It is linked to the on-state resistance of the MOS transistor (RdsON) and thus depends on the current set by the application. It also depends on the transistor size and on the avalanche voltage of the technology.

The turning-off of transistor 1 must occur at a time t3 coming before a time (in principle, unknown) t4 of halfwave change (transition to the new positive halfwave).

According to the present invention, advantage is taken from the fact that the duty cycle variations of voltage Vd are generally small from one period to the other to predict halfwave change time t4 with respect to the previous period P of voltage Vd. In fact, circuit 3 determines an on duration (t3–t2) with respect to the preceding period of voltage Vd. Time interval Δt=t4−t3 is controlled by circuit 3 on a duty cycle change to be maintained at a predetermined value chosen according to the maximum expected extent of the duty cycle variations from one period to another in the considered application.

The turning-off of transistor 1 in advance with respect to the occurrence of the positive halfwave is indispensable to avoid conduction of the system during this positive halfwave, which would cancel the desired rectifying effect. However, upon turning-on of the transistor (time t2), the lag time (interval between times t1 and t2) may be eliminated if the application allows turning on as soon as the negative halfwave begins.

Several means may be envisaged to control time interval Δt on a predetermined minimum value to delay time t3 in case of an increase in period P of voltage Vd or conversely to advance time t3 in case of a shortening of period P, taking into account at least one previous period.

FIG. 6 shows the diagram of an example of the forming of a circuit 3 according to the present invention implementing these functions. It shows, again, transistor 1 to be controlled, as well as diode 2 in parallel. To simplify the discussion, the means for providing supply voltage Vcc have not been shown in FIG. 6. They are, for example, constituted by diode 4 and of capacitor 5 as in FIG. 4.

FIGS. 7A to 7H will be described together with FIG. 6, the operation of which they explain in timing diagrams showing examples of shapes at characteristic points of the circuit.

As discussed previously, the circuit operation is conditioned by the disappearing of voltage Vd or more specifically the switching from a positive to a negative halfwave of this voltage Vd (FIG. 7A, time t1) with the direction conventions of the drawings.

The detection of the direction of voltage Vd is performed by means of a resistive dividing bridge R1-R2 connected between terminals K and A, and having its midpoint connected to the input of an inverter 10. Inverter 10 is used to put in digital form the detection signal. Voltage V10 (FIG. 7B) at the output of inverter 10 is at a positive level (state 1 substantially corresponding to supply voltage Vcc of the inverter) from time t1 and for the entire duration of the negative halfwave of voltage Vd, that is, until time t4.

The output of inverter 10 drives a differentiator 11 (for example, a resistive and capacitive cell RC) having its output connected to the base of an NPN-type bipolar transistor (or an equivalent means) having the function of short-circuiting a capacitor 13 otherwise receiving a current from a current source 14 drawing its power from power supply Vcc. The emitter of transistor 12 is connected to terminal A while its collector is connected to the junction point of source 14 and of capacitor 13. Signal V11 (FIG. 7C) at the output of the differentiator exhibits a pulse of short duration at each time t1 when voltage Vd disappears. This pulse turns on transistor 12, which discharges capacitor 13 (voltage V13, FIG. 7D). From time t5 when the control of transistor 12 disappears, the charge of capacitor 13 by constant current source 14 starts again. The interval between times t1 and t5, set by the time constant of differentiator 11, is chosen to be as small as possible. A sawtooth signal with a period P is thus generated (neglecting pulse t5-t1).

Voltage V13 is applied to the inverting input of an operational amplifier 15. The output of amplifier 15 is sent to the input of two timing elements (for example, delay lines) 16 and 17 introducing respective predetermined delays td1 and td2. Output V15 (FIG. 7E) of amplifier 15 switches high at time t1 when the voltage of its inverting input disappears. FIG. 7F illustrates the shape of voltage V16 at the output of delay element 16. Arbitrarily, it has been assumed in this example that delay td1 is greater than delay td2. It should however be noted that these delays need not be linked to each other. Delay td1 corresponds to the minimum predetermined time interval between times t3 and t4 while delay td2 corresponds to the predetermined turn-on delay of switch 1 (interval between times t1 and t2).

In the example of FIG. 6, it is assumed that delay element 16 only acts on the falling edges of signal V15 and introduces no delay on the rising edges. Similarly, it is assumed that delay element 17 only acts on the rising edges of signal V15. Such assumptions are coherent since times td1 and td2 are in practice negligible as compared to the switching period.

FIG. 7G illustrates the shape of voltage Vc which corresponds to the output of element 17. Optionally, a buffer or level-adapting amplifier 18 is provided between the output of element 17 and the gate of transistor 1. Amplifier 18 then is, preferably, controllable as will be subsequently described in relation with FIG. 8.

The output of element 16 is combined in a gate of X-OR type 19 with the state detected by inverter 10 (signal V10). FIG. 7H illustrates the result of this combination (signal V19), which crosses an integrator 20 before being looped back on the non-inverting input of amplifier 15. The value of the error provided by integrator 20 is visible in FIG. 7D (level V20) and the time when the ramp of signal V13 reaches value V20 corresponds to time t3 when interval td1 starts being downcounted by element 16.

This amounts to adding, to duration td1, a variable time ter which tends towards 0 by the closed-loop control. Time ter corresponds to the control error, the integral of which is multiplied by a coefficient E by integrator 20. This approximately corresponds to a first order linear system. The larger constant E, the faster a variation of the duty cycle is recovered. There theoretically is no limit to value E, except for possible saturation or the like problems.

In FIG. 7, the case where error ter nulls out on the second period is considered. The interval between times t3 and t4 then corresponds to constant td1. Of course, in practice, duration ter tends towards zero but is never really zero.

Preferably, the possible variation of duration ter is limited to constant td1 to avoid, when error ter subtracts to constant td1, for transistor 1 to be conductive while voltage Vd is positive.

An advantage of the present invention is that the transistor control circuit is completely autonomous and requires no fixed voltage reference (for example, the ground) for the circuit to which the rectifying element is connected. The only constraint is that, to enable its supply (provision of voltage Vcc) and a proper operation, the signal applied across transistor 1 must effectively be an A.C. signal.

Figure 8:
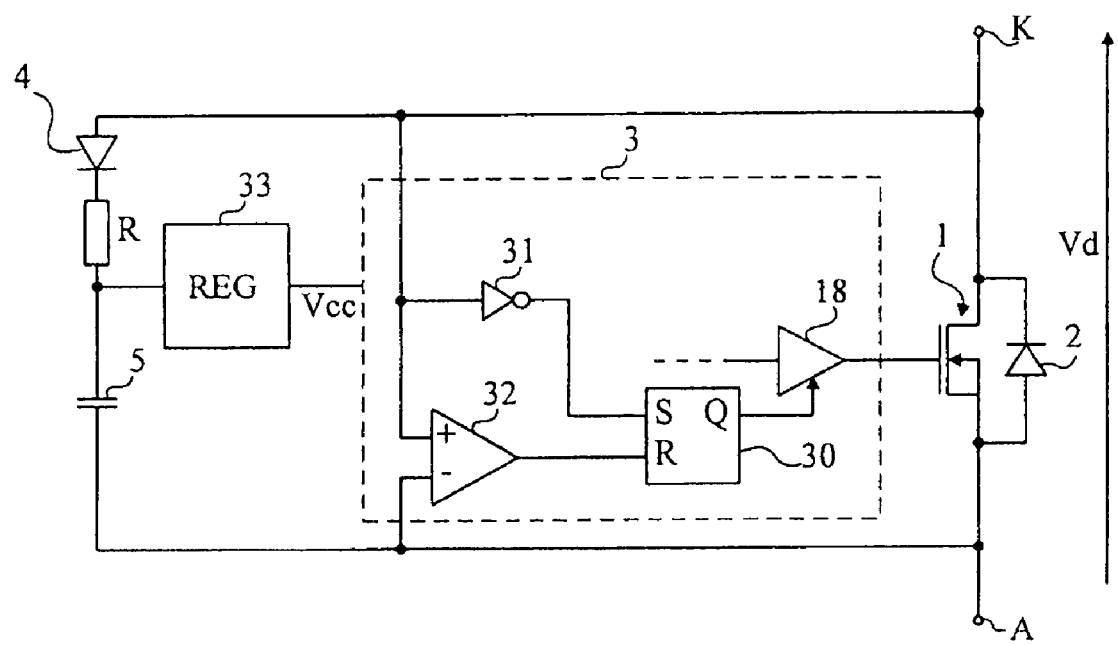
FIG. 8 shows an alternative control circuit according to the present invention, comprising optional protection devices.

FIG. 8 partially shows additional elements of the circuit of FIGS. 4 and 6 according to a preferred embodiment of the present invention. Circuit 3 of FIG. 8 comprises the elements described in relation with FIG. 6, only controllable buffer 18 of which has been shown.

According to this embodiment, circuit 18 is controlled (activated or deactivated) to block the control signal of transistor 1 under the effect of an RS-type flip-flop 30. The input for setting to 1 (S) of flip-flop 30 is connected, by an inverter 31, to cathode K and its input for resetting to 0 (R) is connected to the output of an operational amplifier 32. The respective inverting and non-inverting inputs of amplifier 32 are connected to terminals K and A. The function of such an assembly is to turn off the MOS transistor if, incidentally, the voltage between terminals K and A inverts during a negative halfwave. Indeed, as soon as voltage Vd becomes positive, the output of amplifier 22 switches high, which turns off amplifier 18.

However, at each falling edge of voltage Vd, signal S switches to state 1, which activates amplifier 18.

FIG. 18 illustrates another alternative concerning the supply circuit. The case in point is to insert a resistor R between diode 4 and capacitor 5. This resistor R enables the charge current of capacitor 5 to be of leakage current type while it is of recovery current type in the absence of resistor R. The voltage provided by capacitor 5 may be regulated by a circuit 33 (REG) before providing voltage Vcc to block 3.

Figure 2:
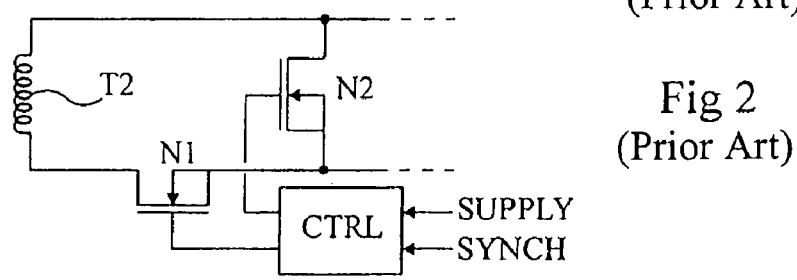
Figure 3:
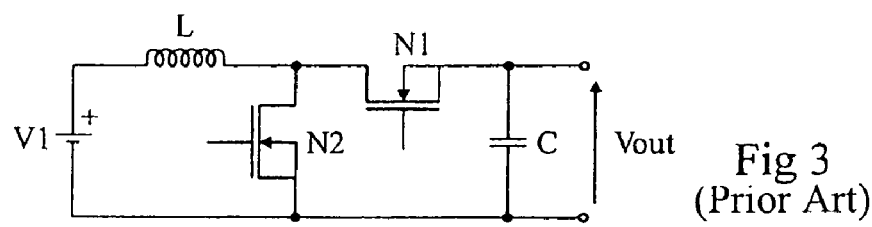

An advantage of the present invention is that it provides a unidirectional autonomous circuit likely to replace a diode in many applications. Further, the present invention enables replacing a transistor in a synchronous operation since the circuit performs an automated synchronization with respect to the voltage present between terminals A and K. In this type of application, the present invention enables preserving the switch position on the positive line (conversely to FIG. 2 where transistor N1 is on the ground line). It is thus avoided to cut the ground line, which considerably improves the fulfilling of electromagnetic constraints.

Another advantage of the present invention is that (except for short switching times (durations td2 and td1+ter)), the series voltage drop of the rectifying element of the present invention corresponds to that of a MOS transistor and is thus considerably smaller than that of a diode.

Of course, the present invention is likely to have various alterations, modifications, and improvements which will readily occur to those skilled in the art. In particular, other circuits than those illustrated in relation with FIG. 6 may be used to perform the functions of introducing a predetermined turn-on delay and a variable turn-off delay for the MOS transistor. Similarly, in an implementation of the type of that of FIG. 6, the logic states selected for the operation of circuit 3 are arbitrary, provided that the level of signal Vc is compatible with the control of transistor 1.

Further, the connection of a rectifying circuit according to the present invention in a conventional converter is within the abilities of those skilled in the art based on the functional indications given hereabove.

Moreover, although the use of a MOS transistor is preferred, other switches can be envisaged. For example, a bipolar transistor may be used, with the provision of a current control and an oversizing of system supply capacitor 5.

Such alterations, modifications, and improvements are intended to be part of this disclosure, and are intended to be within the spirit and the scope of the present invention. Accordingly, the foregoing description is by way of example only and is not intended to be limiting. The present invention is limited only as defined in the following claims and the equivalents thereto.

What is claimed is:

1. A circuit for controlling a switch to be controlled in a unidirectional fashion while the voltage present thereacross is an A.C. voltage, comprising:
   means for delaying the switch turning-on with respect to a zero crossing of the voltage thereacross; and
   means for triggering the switch turning-off after its turning on, at the end of a predetermined time interval plus or minus an error time after the turning on of the switch, the predetermined time interval beginning at the turning on of the switch, the error time for the present period of the A.C. voltage being controlled by the previous duty cycle of the A.C. voltage across the switch, in one or several previous periods.

2. The circuit of claim 1, wherein said predetermined duration is selected according to the maximum expected variations of the duty cycle.

3. The circuit of claim 1, wherein a capacitor and a diode are series-connected between the terminals of the switch to provide a supply voltage to the control circuit, the capacitor being charged when the switch is off.

4. The circuit of claim 1, comprising:
   a circuit for detecting the sign of the voltage across the capacitor;
   a ramp generator reset on each sign switching of the voltage across the switch in a direction in which it must become conductive, said generator being controlled by the detection circuit;
   a means for causing the turning-on of the switch after detection of a sign switching of the voltage thereacross; and
   a circuit for controlling the duration of the on state with a predetermined value.

5. The circuit of claim 4, wherein a first delay element brings a minimum delay to a turn-off order of the switch which follows its turning-on.

6. The circuit of claim 5, wherein a second delay element brings a delay to the turning-on of the switch with respect to the inversion of the voltage thereacross.

7. The circuit of claim 1, wherein an output amplifier providing the control signal of the switch is controlled by means for detecting an inversion of the voltage direction, to cause the turning-off of the switch in case of an incidental voltage inversion.

8. The circuit of claim 1, wherein the switch is a MOS transistor.

9. The circuit of claim 1, wherein a diode in parallel on the switch is used for the starting.

10. A rectifying circuit with a low threshold voltage comprising a switch in parallel with a diode preferably formed of its parasitic diode, and the control circuit of claim 1 associated with a supply circuit drawing its power supply directly from across the controlled transistor when said transistor is on.

11. The circuit of claim 10, exclusively comprising two external connection terminals.

12. A method of controlling a switch, the method comprising:
applying a control signal that controls the switch, the control signal being applied in response to an A.C. voltage across the switch, such that the switch is turned off when a positive voltage is across the switch;
detecting that the voltage across the switch has changed from a positive voltage to a negative voltage, thereby detecting a beginning a halfwave of the A.C. voltage across the switch:
turning the switch on after the beginning of the halfwave of the A.C. voltage; and
after turning the switch on and during the halfwave of the A.C. voltage, controlling a timing of turning off the switch based on a time at which the A.C. voltage changed from a negative voltage to a positive voltage during at least one previous period of the A.C. voltage, thereby turning off the switch prior to the end of the halfwave of the A.C. voltage across the switch.

13. The method of claim 12, wherein the turning off of the switch is controlled to occur at a time that is a predetermined time interval prior to the A.C. voltage changing from a negative voltage to a positive voltage.

14. The method of claim 13, wherein the turning off of the switch is controlled to occur at a time that is a predetermined time interval prior to a time at which the A.C. voltage is expected to change from the negative voltage to the positive voltage, the timing of the turning off of the switch being determined at least partially based on an error time, the error time being determined based on the time at which the A.C. voltage changed from a negative voltage to a positive voltage during at least one previous period of the A.C. voltage.

15. The method of claim 14, wherein the error time is determined based on the time at which the A.C. voltage changed from a negative voltage to a positive voltage during a single period of the A.C. voltage immediately prior to a present period of the A.C. voltage.

16. The method of claim 12, further comprising:
providing a ramp signal that is reset upon the A.C voltage changing from a positive voltage to a negative voltage;
comparing the ramp signal with an error voltage that represents a change in a duration of a period of the A.C. voltage, the comparison resulting in a control signal; and
controlling the switch based using the control signal.

17. The method of claim 12, further comprising:
delaying a turning on of the switch with respect to a zero crossing of the A.C. voltage across the switch.

18. A circuit for controlling a switch, the circuit comprising: a control circuit that measures an A.C. voltage present between first and second terminals of the switch and controls the switch in response to the A.C. voltage such that substantially all of the current that flows through the switch between the first and second terminals is unidirectional, wherein the control circuit controls the switch by applying a control signal to a control terminal of the switch, the control terminal being different from the first and second terminals, wherein the control circuit controls the switch to turn on during the present halfwave of the A.C. voltage and controls a timing of turning off the switch during the present halfwave based on a time at which the A.C. voltage changed from a negative voltage to a positive voltage during at least one previous period of the A.C. voltage, thereby turning off the switch prior to the end of the present halfwave of the A.C. voltage.

19. The circuit of claim 18, wherein the control circuit comprises a detection circuit coupled to at least two terminals of the switch that detects a polarity of the A.C. voltage across the switch.

20. The circuit of claim 18, wherein the control circuit comprises a ramp generator that provides a voltage ramp waveform such that the voltage ramp waveform is reset to an initial value in response to the A.C. voltage changing from a positive voltage to a negative voltage.

21. The circuit of claim 18, wherein the control circuit comprises a feedback loop that provides a feedback signal representative of a change in a duration of a period of the A.C. signal, the feedback loop including a first delay element.

22. The circuit of claim 21, wherein the control circuit further comprises:
a ramp generator that provides a voltage ramp waveform; and
a comparison circuit that compares the voltage ramp waveform to the feedback signal and provides a control signal that turns off the switch at a time that is approximately the duration of a delay of the first delay element prior to the A.C. voltage changing from a negative voltage to a positive voltage.

23. The circuit of claim 22, wherein the control signal controls the turning off of the switch to occur at a determined time prior to the A.C. voltage changing from a negative voltage to a positive voltage, the determined time being the duration of the first delay element plus or minus an error time.

24. The circuit of claim 23, wherein the error time is a difference between a duration of a present period of the A.C. voltage and a duration of a previous period of the A.C. voltage.

25. The circuit of claim 22, wherein the duration of the delay of the first delay element is greater than approximately an expected variation in durations of a period of the A.C. voltage from a first period to an immediately following period.

26. The circuit of claim 18, wherein the control circuit further comprises:
a second delay element that delays the switch from switching on until a duration of the second delay element after the A.C. voltage changes from a positive voltage to a negative voltage.

27. The circuit of claim 18, further comprising a controllable buffer that prevents the switch from turning on when the A.C. voltage is a positive voltage.

28. The circuit of claim 18, wherein the circuit controls the switch without receiving a synchronization signal to control times at which the switch is turned on or off.

29. The circuit of claim 18, wherein the control circuit is powered only by the A.C. voltage.

30. The circuit of claim 18, wherein the circuit delays a turning on of the switch with respect to a zero crossing of the A.C. voltage across the switch.

31. The circuit of claim 18, wherein the switch is a rectifying element.

* * * * *